United States Patent
Elias et al.

(10) Patent No.: US 8,072,098 B2
(45) Date of Patent: Dec. 6, 2011

(54) REMOTELY CONFIGURABLE ANALOG/DIGITAL INPUT CIRCUIT AND RELATED APPARATUS AND METHOD

(75) Inventors: Jack Elias, Lansdale, PA (US); Giancarlo Punis, Chalfont, PA (US)

(73) Assignee: Honeywell International Inc., Morristown, NJ (US)

( * ) Notice: Subject to any disclaimer, the term of this patent is extended or adjusted under 35 U.S.C. 154(b) by 213 days.

(21) Appl. No.: 12/547,293

(22) Filed: Aug. 25, 2009

(65) Prior Publication Data
US 2010/0079007 A1    Apr. 1, 2010

Related U.S. Application Data

(60) Provisional application No. 61/101,071, filed on Sep. 29, 2008.

(51) Int. Cl.
*H01H 9/54* (2006.01)
(52) U.S. Cl. ........................................ 307/140
(58) Field of Classification Search ............... 307/140
See application file for complete search history.

(56) References Cited

U.S. PATENT DOCUMENTS

| | | | |
|---|---|---|---|
| 5,293,122 A | 3/1994 | Cake et al. | |
| 6,061,809 A | 5/2000 | Glaser et al. | |
| 6,170,439 B1 | 1/2001 | Duncan et al. | |
| 7,480,126 B2 * | 1/2009 | Cetrulo et al. | ............ 361/91.1 |
| 2007/0213652 A1 | 9/2007 | Carter | |

OTHER PUBLICATIONS

"HC900 Hybrid Controller, Instalation and User Guide", Honeywell, Jan. 2008, 5 pages.

* cited by examiner

*Primary Examiner* — Robert L. Deberadinis
(74) *Attorney, Agent, or Firm* — Munck Carter, LLP

(57) ABSTRACT

An apparatus includes first and second input terminals configured to be coupled to one of multiple types of input sources. The apparatus also includes a diode and a resistor coupled in series between the first and second input terminals. The apparatus further includes a plurality of switches each coupled to at least one of the diode and the resistor. The switches are configured to be opened and closed to reconfigure the apparatus depending on the type of input source. The switches could include a first switch coupled to the first input terminal, a current source, and a first side of the diode. The switches could also include a second switch coupled to the current source, a second side of the diode, and a first side of the resistor. In addition, the switches could include a third switch coupled to the second input terminal and a second side of the resistor.

20 Claims, 8 Drawing Sheets

REMOTELY CONFIGURABLE ANALOG/DIGITAL INPUT CIRCUIT AND RELATED APPARATUS AND METHOD

CROSS-REFERENCE TO RELATED APPLICATIONS

This application claims priority under 35 U.S.C. §119(e) to U.S. Provisional Application No. 61/101,071 filed on Sep. 29, 2008, which is hereby incorporated by reference.

TECHNICAL FIELD

This disclosure relates generally to process control and monitoring systems and other systems. More specifically, this disclosure relates to a remotely configurable analog/digital input circuit and related apparatus and method.

BACKGROUND

A process monitoring and control system may include wireless sensors used to measure various characteristics within an industrial facility. Physical transducers coupled to or used in the wireless sensors may have any of several types of electrical characteristics, such as high-level analog inputs (HLAIs), low-level analog inputs (LLAIs), and digital (ON/OFF) contact-closure inputs. Example HLAI signal sources include 0-20 mA or 4-20 mA current sources. Example LLAI signal sources include thermocouples and other sensors with outputs ranging from ±0.01V to ±0.1V.

In conventional systems, it is typically necessary to add a current shunt resistor across input terminals of a wired or wireless sensor in order to change an input of the sensor from accepting a low-level (voltage) input to accepting a high-level (current) input. Adding or removing the current shunt resistor requires access to field wiring terminals in order to manually add or remove the resistor from the sensor. An alternate approach uses an electromechanical switch to break the circuit to the shunt resistor, but this approach still requires physical access to the sensor in order to operate the switch manually.

Physical access to a sensor may be difficult or dangerous. For example, the sensor may be located in a hazardous environment or a difficult-to-access location, such as at the top of a tower. Also, for protection from moisture or corrosive environments, electronic components in a sensor may be conformally coated, making it impractical to use a removable resistor or an electromechanical switch.

SUMMARY

This disclosure provides a remotely configurable analog/digital input circuit and related apparatus and method.

In a first embodiment, an apparatus includes first and second input terminals configured to be coupled to one of multiple types of input sources. The apparatus also includes a diode and a resistor coupled in series between the first and second input terminals. The apparatus further includes a plurality of switches each coupled to at least one of the diode and the resistor. The switches are configured to be opened and closed to reconfigure the apparatus depending on the type of input source.

In a second embodiment, a system includes an input circuit configured to be coupled to one of multiple types of input sources. The system also includes circuitry configured to receive an input signal from the input source through the input circuit and to process the input signal. The input circuit includes a plurality of switches configured to be remotely opened and closed to reconfigure the input circuit depending on the type of input source coupled to the input circuit.

In a third embodiment, a method includes coupling an input source to an input circuit. The method also includes remotely adjusting a configuration of the input circuit based on a type of the input source, where the input source includes one of multiple types of input sources. The method further includes providing via the input circuit an input signal from the input source to circuitry for processing the input signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
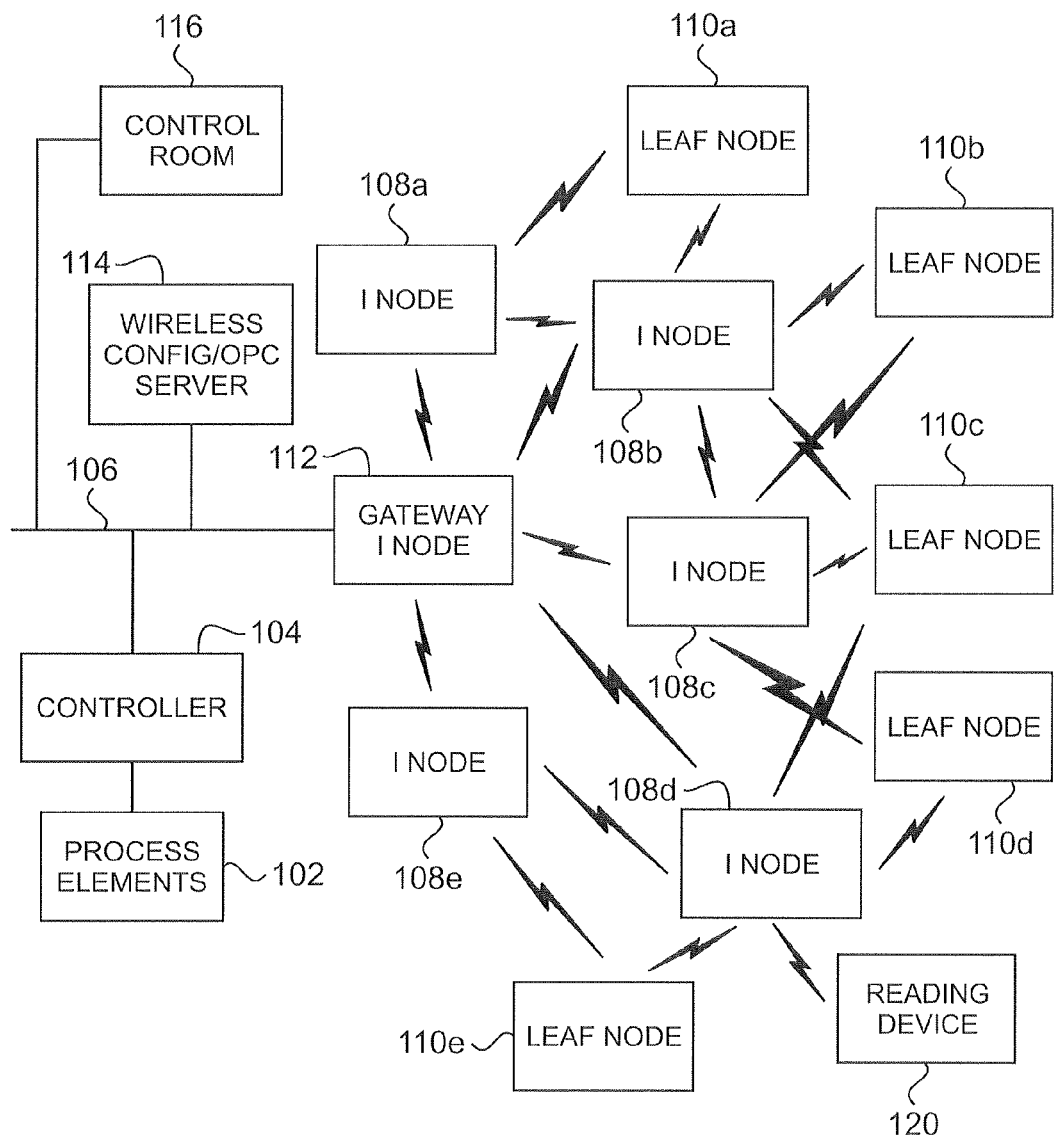
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations. In some embodiments, the network 106 could represent multiple networks, such as a pair of Ethernet networks or a FAULT TOLERANT ETHERNET (FTE) network from HONEYWELL INTERNATIONAL INC. (which includes a redundant pair of Ethernet networks).

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies. The leaf nodes 110a-110e may represent routing or non-routing devices.

The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the gateway typically represented by node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. A particular example of a wireless mesh network is the ONEWIRELESS network from HONEYWELL INTERNATIONAL INC. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A wireless configuration and Object Linking and Embedding (OLE) for Process Control (OPC) server 114 can configure and control various aspects of the process control system 100. For example, the server 114 could configure the operation of the nodes 108a-108e, 110a-110e, and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

A control room 116 in the process control system 100 typically represents a room or other area containing operator stations (such as desktop computers or computer terminals) used by human operators. The operator stations in the control room 116 typically receive data associated with operation of the process control system. The operator stations in the control room 116 also typically include various displays presenting that information to human operators. The operator stations in the control room 116 further typically allow the operators to review current and historical data associated with the operation of the process control system and to adjust the operation of the process control system. As a particular example, the operator stations often allow the operators to make manual adjustments to controllers 104 or to otherwise control the operation of the process control system from the control room 116.

As described in more detail below, various components of the system 100 (such as process elements 102 and leaf nodes 110a-110e) include one or more remotely configurable analog/digital input circuits. These circuits can be remotely configured, such as from the control room 116 or from portable user devices. As particular examples, each of these circuits can be remotely configured to represent a high-level analog input (HLAI), a low-level analog input (LLAI), or a digital input (DI) such as a contact-closure input. For instance, each reconfigurable circuit could include a semiconductor diode connected in series with a current shunt resistor across an input. A plurality of switches couple an analog-to-digital converter (ADC) or other circuitry to the diode and the current shunt resistor in a selectable circuit configuration. The ADC or other circuitry is operable to measure or otherwise use a state of a current source, voltage source, or switch closure coupled to the input. In this way, the remotely configurable input circuit can be reconfigured as needed without opening the device containing the input circuit. In fact, the device containing the input circuit need not be physically accessed by any personnel in order to perform the reconfiguration.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, servers, and control rooms. Also, the functional division shown in FIG. 1 is for illustration only. Various components in FIG. 1 could be combined, subdivided, or omitted and additional components could be added according to particular needs. In addition, FIG. 1 illustrates one example of an operational environment where remotely configurable analog/digital input circuits could be used. These input circuits could be used in any other suitable device or system (whether or not related to process control).

Figure 2:
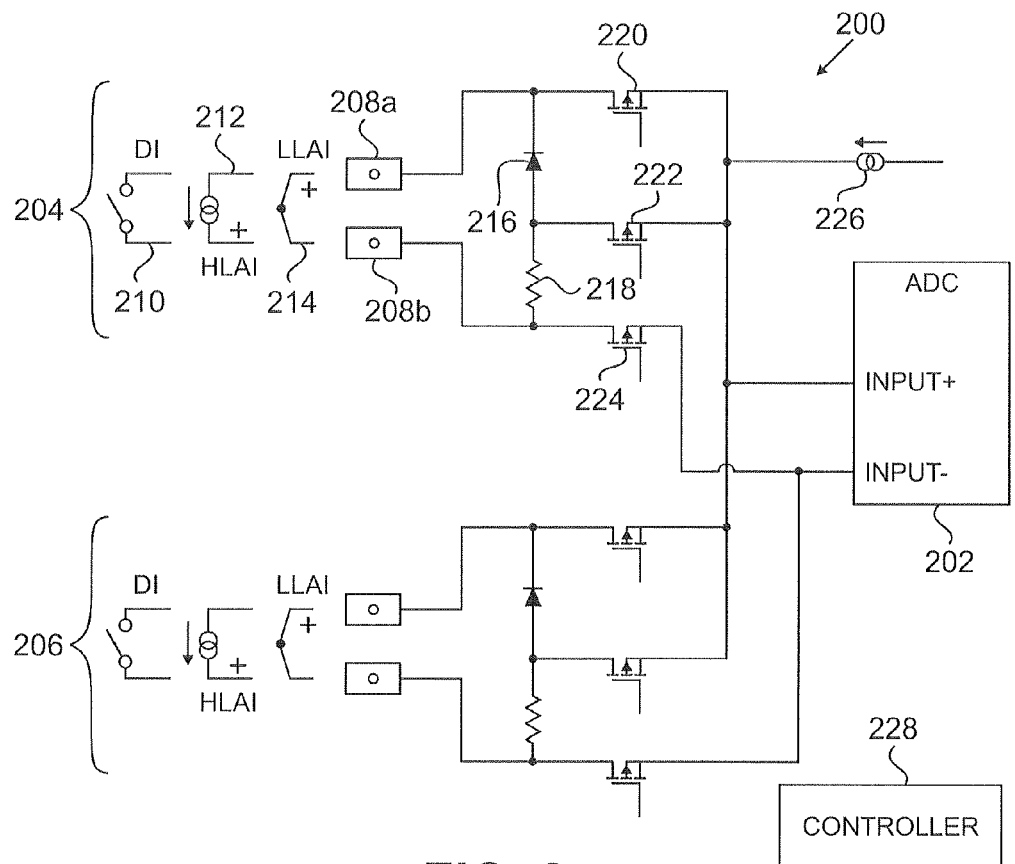
FIG. 2 illustrates an example device having at least one remotely configurable analog/digital input circuit according to this disclosure.

FIG. 2 illustrates an example device 200 having at least one remotely configurable analog/digital input circuit according to this disclosure. The device 200 could, for example, form part of a process element 102 or leaf node 110a-110e in FIG. 1 or other device having a reconfigurable input.

As shown in FIG. 2, the device 200 includes an analog-to-digital converter 202 or other circuit. The analog-to-digital converter 202 generates a digital output corresponding to an analog input received at its two inputs INPUT±. While shown as including an analog-to-digital converter 202, any suitable circuitry could be used in place of the analog-to-digital converter 202.

The device 200 also includes two reconfigurable inputs 204-206. Each reconfigurable input 204-206 includes two input terminals 208a-208b, which can be coupled to different input sources. In this example, the input sources include a digital source 210, an HLAI source 212, and an LLAI source 214. Each of the terminals 208a-208b includes any suitable structure for coupling to an input source.

Each reconfigurable input 204-206 also includes a semiconductor diode 216 connected in series with a current shunt resistor 218 across the input terminals 208a-208b. The semiconductor diode 216 includes any suitable structure for supporting current flow in substantially one direction. The current shunt resistor 218 includes any suitable resistor having any suitable resistance.

Three semiconductor switches 220-224 are coupled to the semiconductor diode 216 and the current shunt resistor 218. In particular, the semiconductor switch 220 is coupled to one end of the diode 216, the semiconductor switch 222 is coupled to the other end of the diode 216 and one end of the resistor 218, and the semiconductor switch 224 is coupled to the other end of the resistor 224. The semiconductor switches 220-224 can be opened and closed to reconfigure the electrical connections involving the diode 216, the resistor 218, and the analog-to-digital converter 202. In this way, the reconfigurable input 204-206 can be configured appropriately to handle a specified type of input. Each of the semiconductor switches 220-224 includes any suitable switching device, such as a field effect transistor (FET) or an optically coupled MOSFET or "photo-relay" device.

A current source 226 is coupled to the semiconductor switches 220-222. The current source 226 generates a current used to detect whether a digital input is opened or closed. The current source 226 includes any suitable structure for generating a current, such as a MOS current source.

A controller 228 controls the operation of the device 200, such as by setting or adjusting a configuration of the device 200. For example, the controller 228 could receive data from an external source (such as over a wired or wireless connection) identifying a desired configuration of one or more input circuits 204-206. The controller 228 could then open and/or close the switches 220-224 to configure the one or more input circuits appropriately. In this way, the device 200 can be remotely configured by providing suitable data to the controller 228 and the controller 228 providing suitable control signals to the switches. The controller 228 includes any suitable structure for controlling the configuration of at least one input circuit, such as a microprocessor, microcontroller, field programmable gate array, application specific integrated circuit, or other processing or control device.

Figure 3:
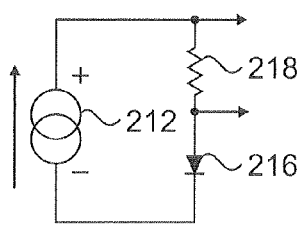
FIGS. 3-5 illustrate example configurations of a remotely configurable analog/digital input circuit according to this disclosure.
Figure 4:
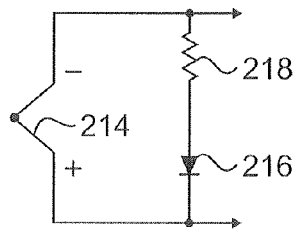
Figure 5:
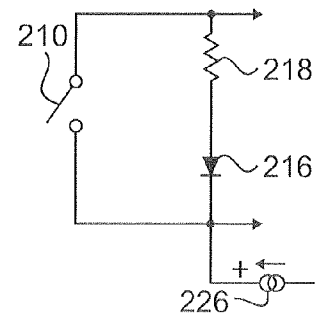

FIGS. 3-5 illustrate example configurations of the remotely configurable analog/digital input circuit 204-206 according to this disclosure. As shown in FIG. 3, when an HLAI current source 212 is being used, the HLAI source 212 may be connected to input terminals 208a-208b of the device 200 such that the diode 216 is forward biased. Doing so allows current from the HLAI source 212 to flow though the current shunt resistor 218. The voltage across the resistor 218 is measured by energizing the transistors 222-224 to connect the voltage signal to the analog-to-digital converter 202, and the transistor 220 is opened.

As shown in FIG. 4, when an LLAI source 214 such as a thermocouple is being used, the LLAI source 214 may be connected to the input terminals 208a-208b in the opposite polarity compared to the HLAI source 212. In this case, the diode 216 blocks current from flowing through the resistor 218. The LLAI source's input may be measured by energizing the transistors 220 and 224 to connect the input signal to the analog-to-digital converter 202, and the transistor 222 is opened.

As shown in FIG. 5, when a digital source 210 is being used, the digital source 210 may be measured by connecting the current source 226 to the input terminals 208a-208b using a polarity that is blocked by the diode 216. The digital input may be measured by energizing the transistors 220 and 224 to connect the input signal to the analog-to-digital converter 202 in order to measure a voltage drop across the input contacts 208a-208b.

The device 200 of FIG. 2 provides for the remote configuration of the reconfigurable inputs 204-206. The device 200 can therefore eliminate the need for physical access to the terminals 208a-208b or to any part of the device 200. The device 200 here can accommodate multiple types of inputs (such as HLAI, LLAI, and digital inputs) without requiring the manual addition or removal of a current shunt resistor and without requiring manual operation of a switch. All components of the device 200 may be conformally coated for protection from moisture or corrosive environments. The device 200 may be mounted in a hazardous environment and be configured without opening the device.

Although FIG. 2 illustrates an example device 200 having at least one remotely configurable analog/digital input circuit, various changes may be made to FIG. 2. For example, the device 200 could include any number of reconfigurable inputs, such as a single input or more than two inputs. Also, any other or additional types of input sources could be coupled to a reconfigurable input. Although FIGS. 3-5 illustrate example configurations of a remotely configurable analog/digital input circuit 204-206, various changes may be made to FIGS. 3-5. For instance, any other or additional types of input sources requiring similar or different configurations of an input circuit could be used.

Figure 6:
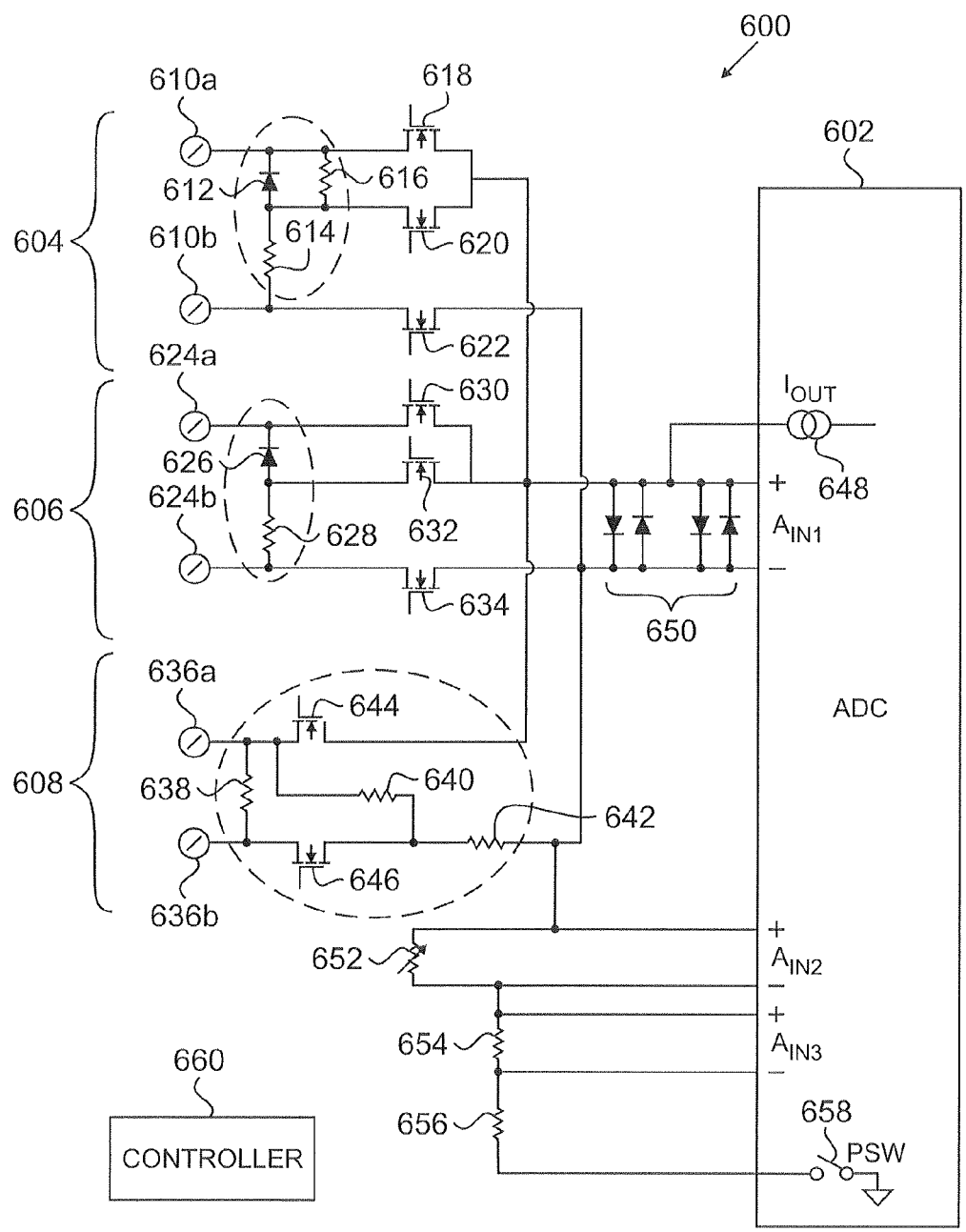
FIG. 6 illustrates another example device having at least one remotely configurable analog/digital input circuit according to this disclosure.

FIG. 6 illustrates another example device 600 having at least one remotely configurable analog/digital input circuit according to this disclosure. The device 600 could, for example, form part of a process element 102 or leaf node 110a-110e in FIG. 1 or other device having a reconfigurable input.

As shown in FIG. 6, the device 600 includes an analog-to-digital converter 602 or other circuit that can receive and process three or more inputs $A_{IN1}$-$A_{IN3}$. The device 600 also includes three inputs 604-608, at least two of which are configurable. The first input 604 includes two input terminals 610a-610b with a semiconductor diode 612 and a current shunt resistor 614 coupled in series between the terminals 610a-610b. Another resistor 616 is coupled in parallel with the diode 612. One transistor 618 is coupled to first ends of the diode 612 and resistor 616. Another transistor 620 is coupled to second ends of the diode 612 and resistor 616 and to a first end of the resistor 614. A third transistor 622 is coupled to a second end of the resistor 614.

The second input 606 includes two input terminals 624a-624b with a semiconductor diode 626 and a current shunt resistor 628 coupled in series between the terminals 624a-624b. One transistor 630 is coupled to a first end of the diode 626. Another transistor 632 is coupled to a second end of the diode 626 and to a first end of the resistor 628. A third transistor 634 is coupled to a second end of the resistor 628.

The third input 608 includes two input terminals 636a-636b with a resistor 638 coupled between the terminals 636a-636b. A resistor 640 is coupled to the resistor 638, and a resistor 642 is coupled to the resistor 640. One transistor 644 is coupled to first ends of the resistors 638-640. Another transistor 646 is coupled to second ends of the resistors 638-640 and to the resistor 642.

A current source 648 may be used within or external to the analog-to-digital converter 602 to generate a current used for sensing a status of at least one digital input. Four diodes 650 are placed across a first pair of inputs $A_{IN1}$ of the analog-to-digital converter 602. These diodes 650 include multiple diode pairs (connected as a redundant pair in each polarity) and can be used to satisfy safety or other requirements. For example, if a sense resistor (resistor 614) fails in an open state, the full loop supply voltage could appear at the ADC input pins and possibly propagate to other components, causing an unsafe situation. The diodes 650 here clamp or limit this voltage to one diode drop (approximately 0.6V). Note that it may be possible to place multiple diodes in series in place of each diode 650, such as when two diodes are used in place of each diode 650 (in which case the voltage would be limited to two diode drops or approximately 1.2V).

A thermistor 652 is placed across a second pair of inputs $A_{IN2}$ of the analog-to-digital converter 602. Two additional resistors 654-656 are coupled in series between the thermistor 652 and a PSW switch 658. A voltage across the resistor 654 is provided to a third pair of inputs $A_{IN3}$ of the analog-to-digital converter 602. A controller 660 controls the device 600, such as by controlling the configurations of the inputs.

In particular embodiments, the transistors 618-622, 630-634, 644 may represent 400V/30 mA solid state relays (SSRs) in SO4 packages. The transistor 646 may represent a 400V/30 mA or 60V/0.5 A solid state relay in an SO4 package. The resistor 614 could represent a 10Ω or 2.05 kΩ resistor. The resistor 616 could represent a 100 kΩ resistor. The resistors 628, 638 could represent 10Ω resistors. The resistors 640-642 could represent 0Ω resistors.

The components shown within the dashed lines of FIG. 6 may be selectively populated within a circuit, depending on the implementation. For example, in a first embodiment shown in FIG. 7, the resistors 616 and 640 may be omitted. In this embodiment, the first and second inputs 604-606 may be configured as HLAI current, LLAI, or digital inputs, and the third input 608 is configured as an HLAI current input. In this embodiment, the device 600 could have the following configurations of inputs.

TABLE 1

| Combination | HLAI | LLAI | DI |
|---|---|---|---|
| 1 | 1 | 1 | 1 |
| 2 | 1 | 2 | 0 |
| 3 | 1 | 0 | 2 |
| 4 | 2 | 1 | 0 |
| 5 | 2 | 0 | 1 |
| 6 | 3 | 0 | 0 |

Figure 8:
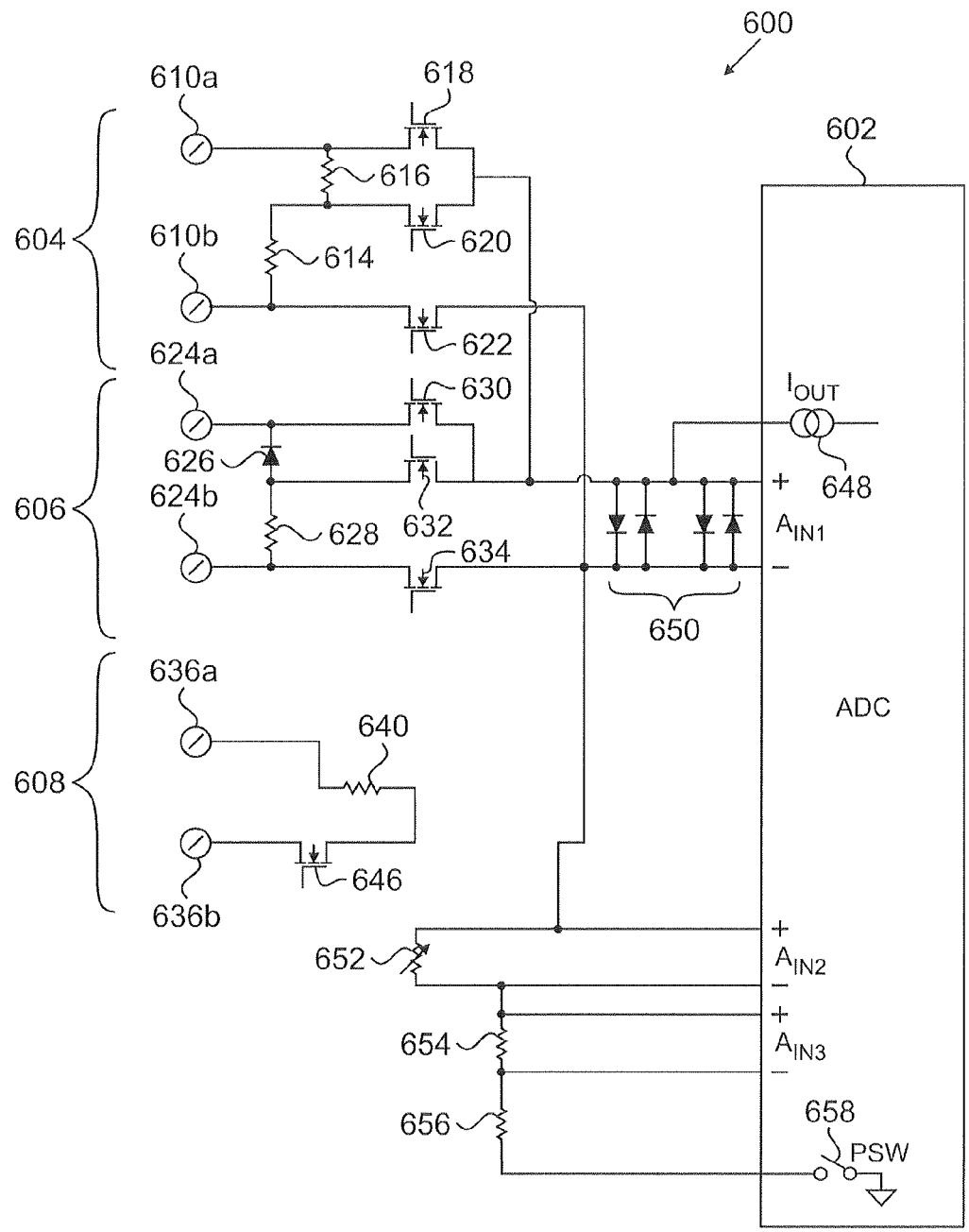

In a second embodiment shown in FIG. 8, the diode 612, the resistors 638 and 642, and the transistor 644 may be omitted. In this embodiment, the first input 604 may be configured as an HLAI voltage, LLAI, or digital input. The second input 606 may be configured as an HLAI current, LLAI, or digital input. The third input 608 is configured as a digital output (DO). In this embodiment, the device 600 could have the following configurations of inputs and outputs.

TABLE 2

| Combination | HLAI | LLAI | DI | DO |
|---|---|---|---|---|
| 1 | 0 | 1 | 1 | 1 |
| 2 | 0 | 2 | 0 | 1 |
| 3 | 0 | 0 | 2 | 1 |
| 4 | 1 | 1 | 0 | 1 |
| 5 | 1 | 0 | 1 | 1 |
| 6 | 2 | 0 | 0 | 1 |

Figure 7:
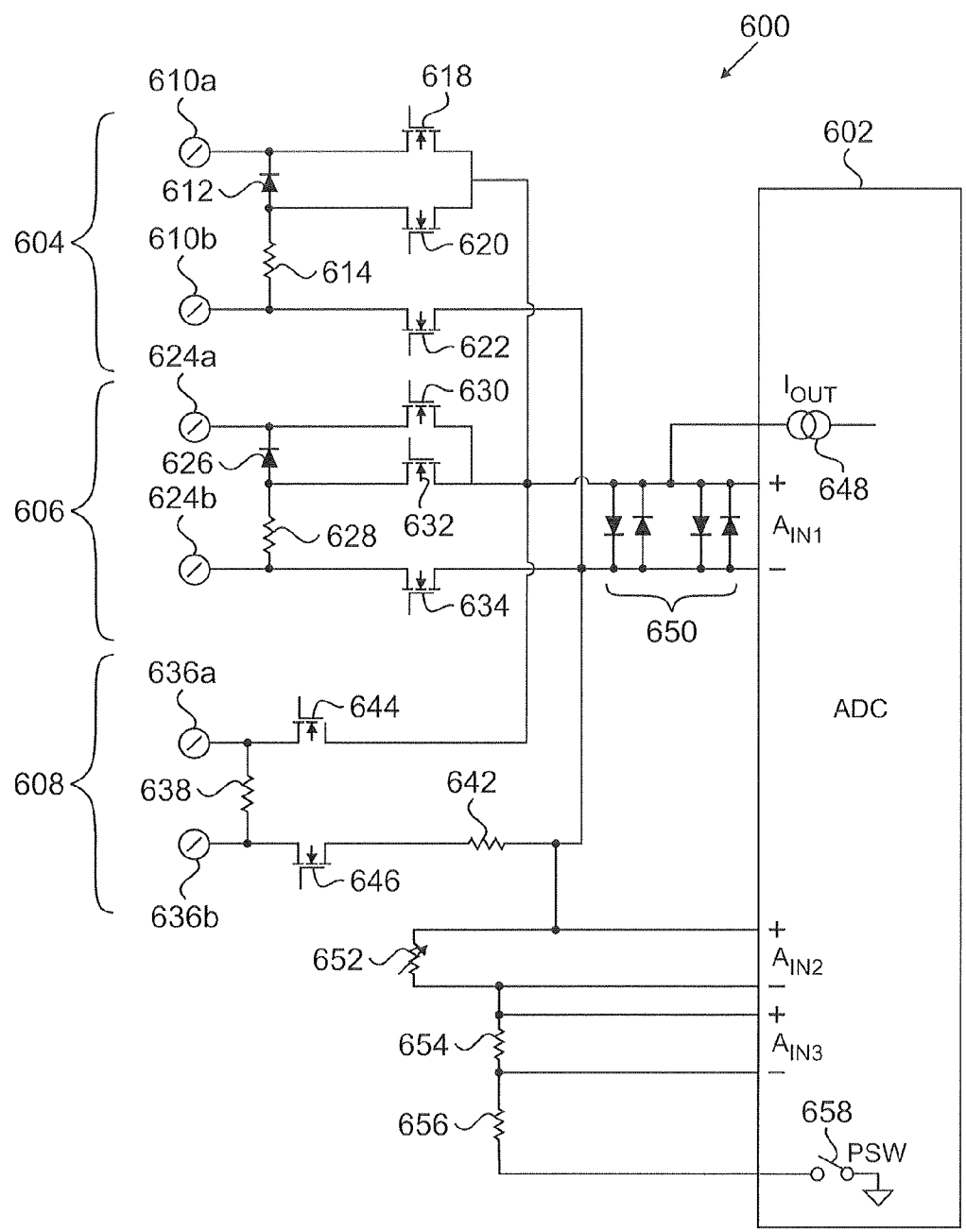
FIGS. 7-8 illustrate configurations of the example device from FIG. 6 according to this disclosure.

In FIG. 6, the inputs 604-606 may represent "universal" inputs in that they can be reconfigured as (voltage or current) HLAI, LLAI, or digital inputs. Take input 604 as an example. In some embodiments, the resistor 614 is 10Ω, the diode 612 is present, and the resistor 616 is omitted as shown in FIG. 7. An HLAI current loop can be coupled to the input terminals 610a-610b such that the current enters into terminal 610b. The current flows through the resistor 614 and the diode 612 and out of terminal 610a. If the current is a 0-20 mA loop current, this can generate a 0-200 mV drop across the resistor 614. If the 10Ω resistor 614 has a 0.5% tolerance, the device 600 can be factory calibrated or otherwise calibrated in order to achieve a 0.1% or other measurement accuracy. For instance, a fixture that uses a two-point calibration (at ≧0 mA and ≦20 mA) could be used to calibrate the device 600.

An LLAI source (such as a thermocouple or millivolt source like a 0-10 mV, 0-50 mV, or 0-100 mV source) can be coupled with its positive lead to the input terminal 610a and its negative lead to the input terminal 610b. As a particular example, a thermocouple could provide an input between −9.8 mV and 76 mV. With a 76 mV input, the diode 612 is reversed-biased. With a −9.8 mV input, the diode 612 is forward-biased but with an insignificant forward current. As another particular example, a millivolt source could provide a maximum input of 100 mV. In particular embodiments, there may be no need to factory calibrate or otherwise calibrate a thermocouple or millivolt source input.

A digital input source (such as a field-mounted switch) can be coupled across the input terminals 610a-610b. The resistance of the switch can be measured by turning on the current source 648, which in particular embodiments produces a 210 µA current. The current could flow out of the terminal 610a, through the remote switch resistance (ideally 0Ω or open circuit), in through the terminal 610b, out through the terminal 636a, in through the terminal 636b, through the thermistor 652 and the resistors 654-656, and to the PSW switch 658. The analog-to-digital converter 602 is configured to close the PSW switch 658 during this conversion, so the 210 µA current returns to ground via the PSW switch 658.

If the remote switch is closed, this could be defined as having a maximum total resistance of 300Ω (100Ω for the remote switch and 200Ω for the wiring). In this case, a 210 µA current could generate a voltage drop between 0 mV and 63 mV, which can be measured by the analog-to-digital converter 602 at the $A_{IN1}$ input. This may be a "rough" calculation since the current source 648 could have an initial accuracy of ±5% with a 200 ppm/° C. temperature coefficient or other variable behavior. Since this is a digital measurement, an error (such as around 6.2%) in switch resistance measurements could be acceptable. Thus, the device 600 can define "switch closed" as a 0-67 mV measurement at the $A_{IN1}$ input.

When the remote switch is open, the 210 µA current bypasses the remote switch and instead flows through the clamping diodes 650 and then through the thermistor 652, the resistors 654-656, and the PSW switch 658. Here, a current of about 105 µA flows through each of the two forward-biased clamping diodes 650. Because of the current-voltage characteristics of the diodes 650, the resulting voltage drop could be 365 mV or greater (where 365 mV may represent a worst case value). Thus, the device 600 can define "switch open" as any measurement at the $A_{IN1}$ input that is greater than 365 mV. Any measurement between 67 mV and 365 mV could be declared "indeterminate" and therefore "bad."

In some embodiments, the resistor 616 is 100 kΩ (±0.1%), the diode 612 is omitted, and the resistor 616 is 2.05 kΩ as shown in FIG. 8. An HLAI voltage loop could be coupled to a voltage source, such as a low-impedance source between 0-5V or 1-5V. Since the input impedance of the input 604 is about 100 kΩ (100 kΩ+2.05 kΩ), the output impedance of the voltage source must be below 100Ω in order to meet a 0.1% or other specified accuracy. The positive terminal of the voltage source is coupled to the terminal 610a, and the negative terminal of the voltage source is coupled to the terminal 610b. An input signal is applied to a voltage divider formed by the resistors 614-616. The resulting voltage (such as 0-0.1004V) can be measured at the $A_{IN1}$ input. Note that the voltage source could be coupled to the terminals 610a-610b with an opposite polarity than that described above. However, the analog-to-digital converter 602 would output values of the wrong polarity, and any component receiving the output values could be designed to handle the values' reversed polarity. In particular embodiments, the HLAI voltage input could be factory calibrated or otherwise calibrated, such as by using the same two-point calibration scheme described above.

Although FIG. 6 illustrates another example device 600 having at least one remotely configurable analog/digital input circuit, various changes may be made to FIG. 6. For example, the device 600 could include any number of reconfigurable inputs, such as a single input or more than two inputs. Also, any other or additional types of input sources could be coupled to a reconfigurable input. Although FIGS. 7-8 illustrate example configurations of the device 600, various changes may be made to FIGS. 7-8. For instance, the device 600 could be configured in any other suitable manner.

Figure 9A:
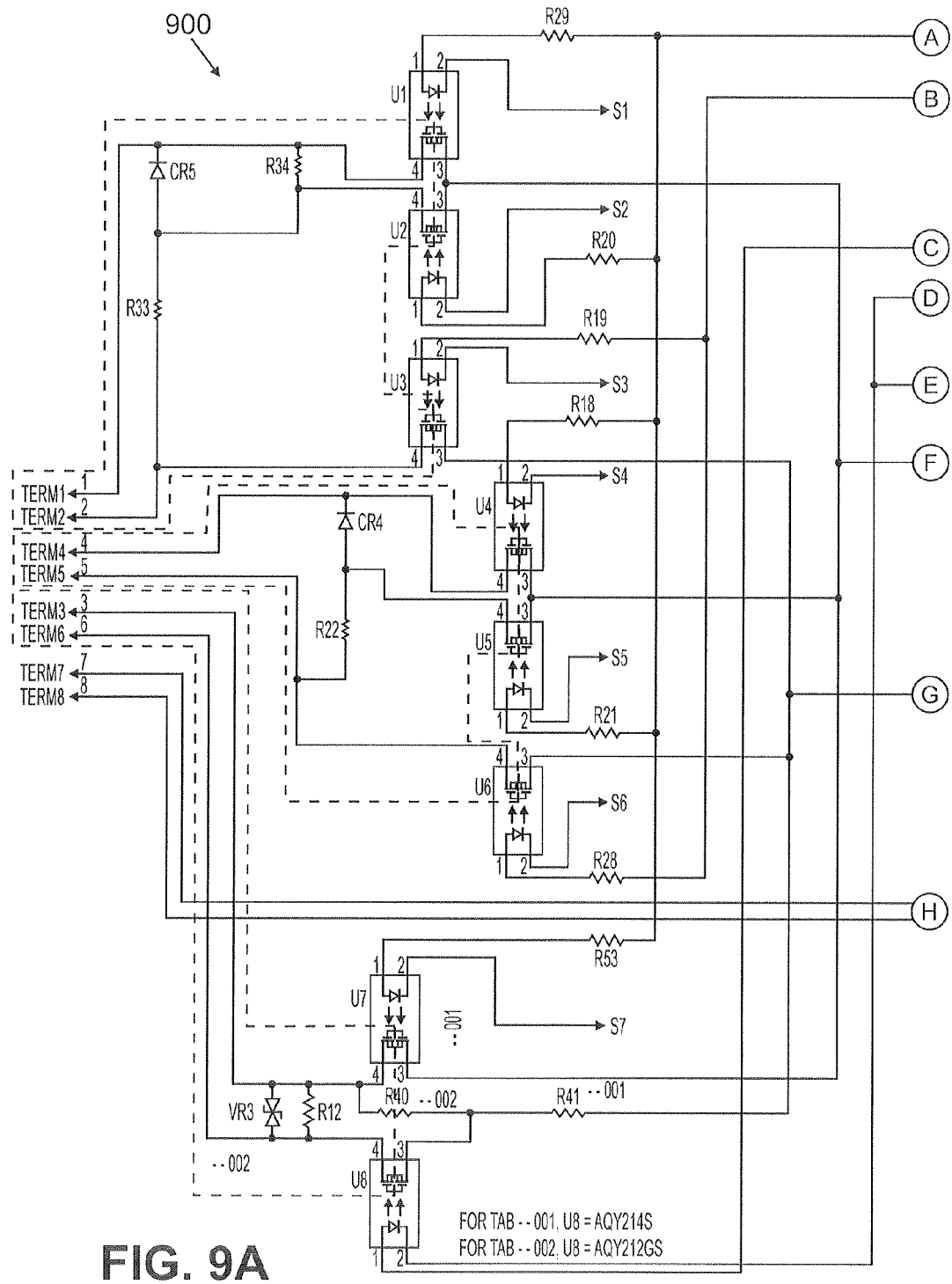
FIGS. 9A-9B illustrate a more detailed example of a device having at least one remotely configurable analog/digital input circuit according to this disclosure.
Figure 9B:
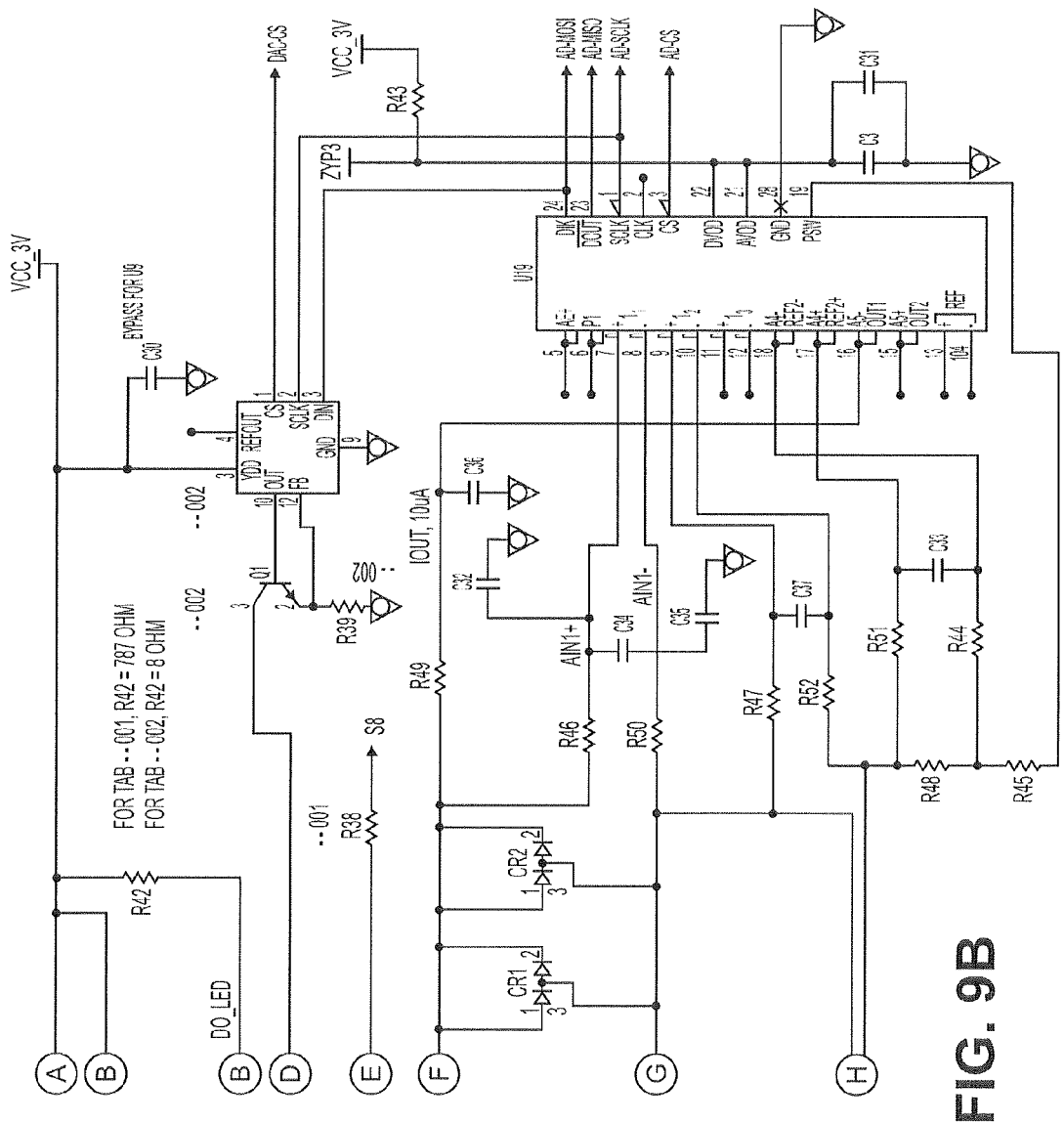

FIGS. 9A-9B illustrate a more detailed example of a device 900 having at least one remotely configurable analog/digital input circuit according to this disclosure. As shown in FIG. 9, the device 900 may represent a more detailed example of the device 600 shown in FIG. 6. In this example, the transistors 618-622, 630-634, 644-646 are implemented using AQY214S high-voltage photo MOS relays. However, the transistors 644-646 could also be implemented using AQY212GS high-current photo MOS relays. The device 900 could be incorporated into any suitable device or system, such as a wireless leaf node or wired sensor from FIG. 1.

Although FIGS. 9A-9B illustrate a more detailed example of a device 900 having at least one remotely configurable analog/digital input circuit, various changes may be made to FIGS. 9A-9B. For example, the circuitry shown in FIGS. 9A-9B could be incorporated into any suitable device or system.

Figure 10:
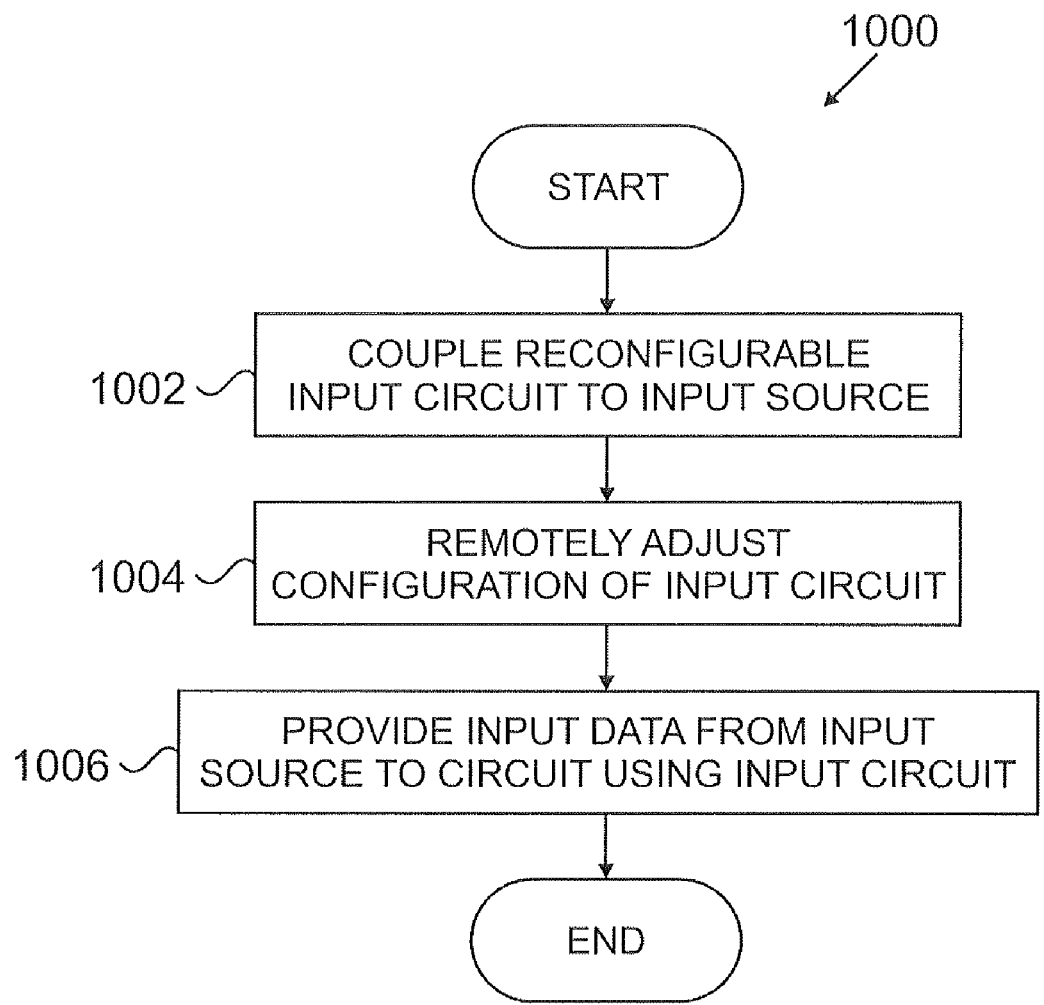
FIG. 10 illustrates an example method for providing a remotely configurable analog/digital input according to this disclosure.

FIG. 10 illustrates an example method 1000 for providing a remotely configurable analog/digital input according to this disclosure. As shown in FIG. 10, an input source is coupled to a reconfigurable input circuit at step 1002. A configuration of the input circuit is remotely adjusted at step 1004. This could include, for example, an operator using a wired or wireless device to provide configuration data to the input circuit, where the configuration data causes switches to open and/or close to configure the input circuit appropriately based on the input source being used. Input data can be provided from the input source to a circuit (such as an ADC) using the configured input circuit at step 1006.

Although FIG. 10 illustrates an example method 1000 for providing a remotely configurable analog/digital input, various changes may be made to FIG. 10. For example, while shown as a series of steps, various steps in FIG. 10 could overlap, occur in parallel, occur in a different order, or occur multiple times.

It may be advantageous to set forth definitions of certain words and phrases used throughout this patent document. The term "couple" and its derivatives refer to any direct or indirect communication between two or more elements, whether or not those elements are in physical contact with one another. The terms "algorithm" and "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a current source;
   first and second input terminals configured to be coupled to one of multiple types of input sources;
   a diode and a resistor coupled in series between the first and second input terminals; and
   a plurality of switches each coupled to at least one of the diode and the resistor, the switches configured to be opened and closed to reconfigure the apparatus depending on the type of input source, wherein the plurality of switches comprises:
      a first switch coupled to the first input terminal, the current source, and a first side of the diode;
      a second switch coupled to the current source, a second side of the diode, and a first side of the resistor; and
      a third switch coupled to the second input terminal and a second side of the resistor.

2. The apparatus of claim 1, wherein:
   the apparatus is configured to be coupled to a High-Level Analog Input (HLAI) source; and
   the apparatus is configured to open the first switch and close the second and third switches such that a voltage across the resistor but not the diode is output by the apparatus.

3. The apparatus of claim 1, wherein:
   the apparatus is configured to be coupled to a Low-Level Analog Input (LLAI) source; and
   the apparatus is configured to open the second switch and close the first and third switches such that a voltage across the resistor and the diode is output by the apparatus.

4. The apparatus of claim 1, wherein:
   the apparatus is configured to be coupled to a digital input source; and
   the apparatus is configured to open the second switch and close the first and third switches such that current from the current source flows through the digital input source and the diode blocks the current from flowing through the resistor.

5. The apparatus of claim 4, further comprising:
   third and fourth input terminals, the third input terminal coupled to the current source and the first and second switches;
   a thermistor coupled to the fourth input terminal;
   second and third resistors coupled in series, the second resistor coupled to the thermistor; and
   a fourth switch coupled to the third resistor.

6. The apparatus of claim 1, wherein the input terminals, diode, resistor, and switches form a first reconfigurable input; and
   further comprising an additional reconfigurable input.

7. The apparatus of claim 1, wherein the multiple types of input sources comprise a High-Level Analog Input (HLAI) source, a Low-Level Analog Input (LLAI) source, and a digital input source.

8. A system comprising:
   an input circuit configured to be coupled to one of multiple types of input sources; and
   circuitry configured to receive an input signal from the input source through the input circuit and to process the input signal;
   wherein the input circuit comprises:
      first and second input terminals configured to be coupled to the input source;
      a diode and a resistor coupled in series between the first and second input terminals;
      a current source; and
      a plurality of switches configured to be opened and closed to reconfigure the input circuit depending on the type of input source coupled to the input circuit, wherein the plurality of switches comprises:
         a first switch coupled to the first input terminal, the current source, and a first side of the diode;
         a second switch coupled to the current source, a second side of the diode, and a first side of the resistor; and
         a third switch coupled to the second input terminal and a second side of the resistor.

9. The system of claim 8, wherein the multiple types of input sources comprise a High-Level Analog Input (HLAI) source, a Low-Level Analog Input (LLAI) source, and a digital input source.

10. The system of claim 8, wherein:
    the input circuit is configured to be coupled to a High-Level Analog Input (HLAI) source; and
    the input circuit is configured to open the first switch and close the second and third switches such that a voltage across the resistor but not the diode is output by the input circuit.

11. The system of claim 8, wherein:
    the input circuit is configured to be coupled to a Low-Level Analog Input (LLAI) source; and
    the input circuit is configured to open the second switch and close the first and third switches such that a voltage across the resistor and the diode is output by the input circuit.

12. The system of claim 8, wherein:
    the input circuit is configured to be coupled to a digital input source; and
    the input circuit is configured to open the second switch and close the first and third switches such that current from the current source flows through the digital input source and the diode blocks the current from flowing through the resistor.

13. The system of claim 12, wherein the input circuit further comprises:
    third and fourth input terminals, the third input terminal coupled to the current source and the first and second switches;
    a thermistor coupled to the fourth input terminal;
    second and third resistors coupled in series, the second resistor coupled to the thermistor; and
    a fourth switch coupled to the third resistor.

14. The system of claim 8, wherein:
the input terminals, diode, resistor, and switches form a first input circuit; and
the system further comprises an additional input circuit.

15. The system of claim 8, wherein the circuitry comprises an analog-to-digital converter configured to digitize the input signal.

16. A method comprising:
remotely adjusting a configuration of an input circuit coupled to an input source based on a type of the input source, the input source comprising one of multiple types of input sources; and
providing via the input circuit an input signal from the input source to circuitry for processing the input signal;
wherein the input circuit comprises a diode and a resistor coupled in series; and
wherein remotely adjusting the configuration of the input circuit comprises controlling at least one switch to selectively (i) couple both ends of the resistor to the processing circuitry, (ii) couple opposing ends of the resistor and the diode to the processing circuitry, and (iii) couple a current source to the input source.

17. The method of claim 16, wherein:
the input source comprises a High-Level Analog Input (HLAI) source; and
remotely adjusting the configuration of the input circuit comprises controlling the at least one switch to couple the ends of the resistor to the processing circuitry.

18. The method of claim 16, wherein:
the input source comprises a Low-Level Analog Input (LLAI) source; and
remotely adjusting the configuration of the input circuit comprises controlling the at least one switch to couple the opposing ends of the resistor and the diode to the processing circuitry.

19. The method of claim 16, wherein:
the input source comprises a digital input source; and
remotely adjusting the configuration of the input circuit comprises controlling the at least one switch to (i) couple the opposing ends of the resistor and the diode to the processing circuitry and (ii) couple the current source to the digital input source.

20. A method comprising:
remotely adjusting a configuration of an input circuit coupled to an input source based on a type of the input source, the input source comprising one of multiple types of input sources; and
providing via the input circuit an input signal from the input source to circuitry for processing the input signal;
wherein remotely adjusting the configuration of the input circuit comprises remotely adjusting the configuration of the input circuit using a wireless communication link.

* * * * *